(12) United States Patent
Kuwahara et al.

(10) Patent No.: US 12,249,741 B2
(45) Date of Patent: Mar. 11, 2025

(54) METHOD AND APPARATUS FOR MANUFACTURING FUEL CELL STACK

(71) Applicant: TOYOTA JIDOSHA KABUSHIKI KAISHA, Toyota (JP)

(72) Inventors: Taiki Kuwahara, Nisshin (JP); Mikio Wada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 487 days.

(21) Appl. No.: 17/651,468

(22) Filed: Feb. 17, 2022

(65) Prior Publication Data

US 2022/0263105 A1 Aug. 18, 2022

(30) Foreign Application Priority Data

Feb. 18, 2021 (JP) ................... 2021-024225

(51) Int. Cl.
*H01M 8/0267* (2016.01)
*H01M 8/0273* (2016.01)
*H01M 8/248* (2016.01)

(52) U.S. Cl.
CPC ....... *H01M 8/0267* (2013.01); *H01M 8/0273* (2013.01); *H01M 8/248* (2013.01)

(58) Field of Classification Search
None
See application file for complete search history.

(56) References Cited

FOREIGN PATENT DOCUMENTS

| CN | 110692155 A | 1/2020 |
|---|---|---|
| JP | 2009129584 A | 6/2009 |
| JP | 2016152109 A | 8/2016 |

*Primary Examiner* — Haroon S. Sheikh
*Assistant Examiner* — Aryana Y. Ortiz
(74) *Attorney, Agent, or Firm* — Hunton Andrews Kurth LLP

(57) ABSTRACT

Provided is a fuel cell stack manufacturing method that can achieve a uniform pitch between fuel cells, that is, unit cells, and can increase the sealing properties between the unit cells. The fuel cell stack manufacturing method is a method for manufacturing a fuel cell stack including the lamination of a plurality of unit cells. This method includes a conveying step and a stacking step. The conveying step conveys the unit cell with its opposite ends held in a state where a pair of separators forming the unit cell vertically faces each other. The stacking step stacks in the vertical direction the plurality of unit cells with the gasket interposed therebetween. The upper and lower sides of the unit cells in the stacking step are inverted from those of the unit cells in the conveying step.

6 Claims, 13 Drawing Sheets

METHOD AND APPARATUS FOR MANUFACTURING FUEL CELL STACK

CROSS REFERENCE TO RELATED APPLICATIONS

The present application claims priority from Japanese patent application JP 2021-024225 filed on Feb. 18, 2021, the entire content of which is hereby incorporated by reference into this application.

BACKGROUND

Technical Field

The present disclosure relates to a method and apparatus for manufacturing a fuel cell stack.

Background Art

Conventionally, an invention relating to a method for manufacturing a fuel cell stack is known (see JP 2009-129584 A). The invention particularly relates to a technique of compressing a cell stack obtained by stacking a plurality of unit cells. JP 2009-129584 A discloses a method for manufacturing a fuel cell stack, including a stacking step of stacking a plurality of unit cells to form a cell stack and a compressing step of compressing the cell stack in the stacking direction of the unit cells by decompressing the inner part of the cell stack (Abstract, claim 1, paragraph 0006, for example).

This conventional method for manufacturing a fuel cell stack can compress the cell stack with a device (e.g., vacuum pump) that decompresses the inner part of the cell stack. This method does not use a traditionally required pressurizing mechanism, and so can compress the cell stack without using a large jig (paragraph 0007 of JP 2009-129584 A).

SUMMARY

A unit cell of a fuel cell stack includes thin plate-like separators, a thin sheet-like membrane electrode and gas diffusion layer assembly, and a resin frame. In the process of manufacturing a fuel cell stack, the unit cell tends to sag when conveyed, for example. Such sagging of the unit cell may lead to a non-uniform pitch between the unit cells or a decrease in the sealing properties of a gasket between the unit cells in the process of manufacturing a fuel cell stack.

The present disclosure provides a method and apparatus for manufacturing a fuel cell stack that can achieve a uniform pitch between individual fuel cells, that is, unit cells, and can increase the sealing properties of the gasket between the unit cells.

One aspect of the present disclosure is a method for manufacturing a fuel cell stack including lamination of a plurality of fuel cells. The method includes: a conveying step of conveying each of the plurality of fuel cells with opposite ends thereof held in a state where a pair of separators forming each of the plurality of fuel cells vertically faces each other; and a stacking step of stacking in a vertical direction the plurality of fuel cells with a gasket interposed therebetween, the fuel cells having upper and lower sides that are inverted from those of the fuel cells in the conveying step.

In the method for manufacturing a fuel cell stack according to the above aspect, the fuel cell may include a recessed engaging part in each of the opposite ends, and in the stacking step, a rail extending in a vertical direction is engaged with the engaging part in each of the opposite ends of the fuel cell and may apply a vertically upward frictional force to each of the opposite ends of the fuel cell.

The method for manufacturing a fuel cell stack according to the above aspect may include a cell manufacturing process of manufacturing the fuel cell. The cell manufacturing process may include a plurality of pressing steps and the conveying step after each of the plurality of pressing steps. The plurality of pressing steps may include: a heating/pressing step of disposing a resin frame and a membrane electrode and gas diffusion layer assembly, which form the fuel cell, between the pair of separators and performing pressing while heating the pair of separators at a temperature higher than a softening point of the resin frame; and a cooling/pressing step of performing pressing while cooling the pair of separators at a temperature lower than the softening point of the resin frame after the heating/pressing step.

In the method for manufacturing a fuel cell stack according to the above aspect, the heating/pressing step may include a first heating/pressing step and a second heating/pressing step that performs pressing while heating the pair of separators at a temperature higher than that in the first heating/pressing step. The cooling/pressing step may include a first cooling/pressing step and a second cooling/pressing step that performs pressing while cooling the pair of separators at a temperature lower than that in the first cooling/pressing step. The conveying step may be performed between the first heating/pressing step and the second heating/pressing step, between the second heating/pressing step and the first cooling/pressing step, and between the first cooling/pressing step and the second cooling/pressing step.

Another aspect of the present disclosure is an apparatus for manufacturing a fuel cell stack including lamination of a plurality of fuel cells. The apparatus may include a conveying device configured to convey each of the plurality of fuel cells with opposite ends thereof held in a state where a pair of separators forming each of the plurality of fuel cells vertically faces each other; and a stacking device configured to stack in a vertical direction the plurality of fuel cells with a gasket interposed therebetween, the fuel cells having upper and lower sides that are inverted from those of the fuel cells in the conveying by the conveying device.

In the apparatus for manufacturing a fuel cell stack according to the above aspect, the fuel cell may include a recessed engaging part in each of the opposite ends. The stacking device may include a rail extending in a vertical direction, and the rail may be engaged with the engaging part when the fuel cells are stacked and may apply a vertically upward frictional force to each of the opposite ends of the fuel cell.

According to the above aspects of the present disclosure, it is possible to provide a method and apparatus for manufacturing a fuel cell stack that can achieve a uniform pitch between individual fuel cells, that is, unit cells, and can increase the sealing properties of a gasket between the unit cells.

DETAILED DESCRIPTION

Hereinafter, an embodiment of a method and apparatus for manufacturing a fuel cell stack according to the present disclosure will be described with reference to the drawings. First, typical configurations of a fuel cell stack and a fuel cell will be described, and then a method and apparatus for manufacturing the fuel cell stack will be described. It should be noted that an individual fuel cell that forms the fuel cell stack may be abbreviated as a "unit cell" in the following descriptions.

(Fuel Cell Stack and Fuel Cell)

Figure 1:
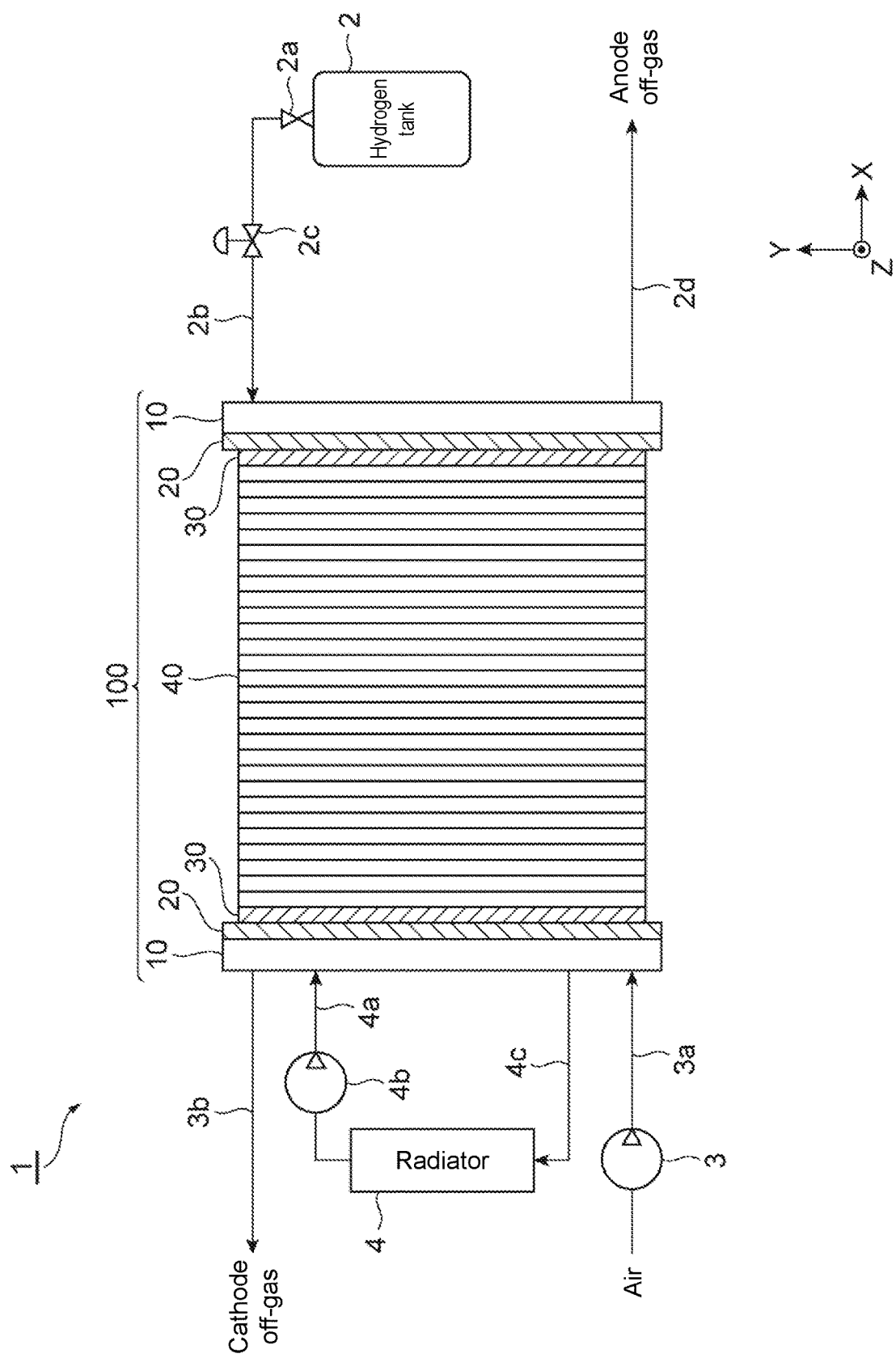
FIG. 1 is a schematic diagram of a fuel cell system including a fuel cell stack.

First, with reference to FIG. 1 to FIG. 3, an example of typical configurations of a fuel cell stack 100 and a fuel cell 40 (i.e., unit cell 40) will be described. FIG. 1 is a schematic diagram of a fuel cell system 1 including the fuel cell stack 100. The fuel cell system 1 includes a hydrogen tank 2, an air pump 3, a radiator 4, and the fuel cell stack 100, for example.

The hydrogen tank 2 is filled with high pressure hydrogen, for example, and coupled to the fuel cell stack 100 via a shut valve 2a, a pipe 2b, and a regulator 2c to supply hydrogen as fuel gas to the fuel cell stack 100. The fuel gas (i.e., anode off-gas) not having been used in the fuel cell stack 100 will be discharged to the outside of the fuel cell stack 100 via a discharge pipe 2d coupled to the fuel cell stack 100. It should be noted that the fuel cell system 1 may have a recirculation mechanism that allows the anode off-gas to be recirculated toward the pipe 2b.

The air pump 3 is coupled to the fuel cell stack 100 via a pipe 3a, for example, to supply air as oxidant gas to the fuel cell stack 100. The oxidant gas (i.e., cathode off-gas) not having been used in the fuel cell stack 100 will be discharged to the outside of the fuel cell stack 100 via a discharge pipe 3b. The fuel gas and the oxidant gas may also be referred to as reactant gas.

The radiator 4 is coupled to the fuel cell stack 100 via a pipe 4a and a pump 4b, for example, to supply refrigerant for cooling the fuel cell stack 100 to the fuel cell stack 100. The refrigerant discharged from the fuel cell stack 100 is circulated through a pipe 4c to the radiator 4. Examples of the refrigerant include water, antifreeze, such as ethylene glycol or the like, and air, for example.

The fuel cell stack 100 has a stack structure including the lamination of an end plate 10, an insulating plate 20, a current collector plate 30, a plurality of unit cells 40, a current collector plate 30, an insulating plate 20, and an end plate 10 that are stacked in this order, for example.

Figure 2:
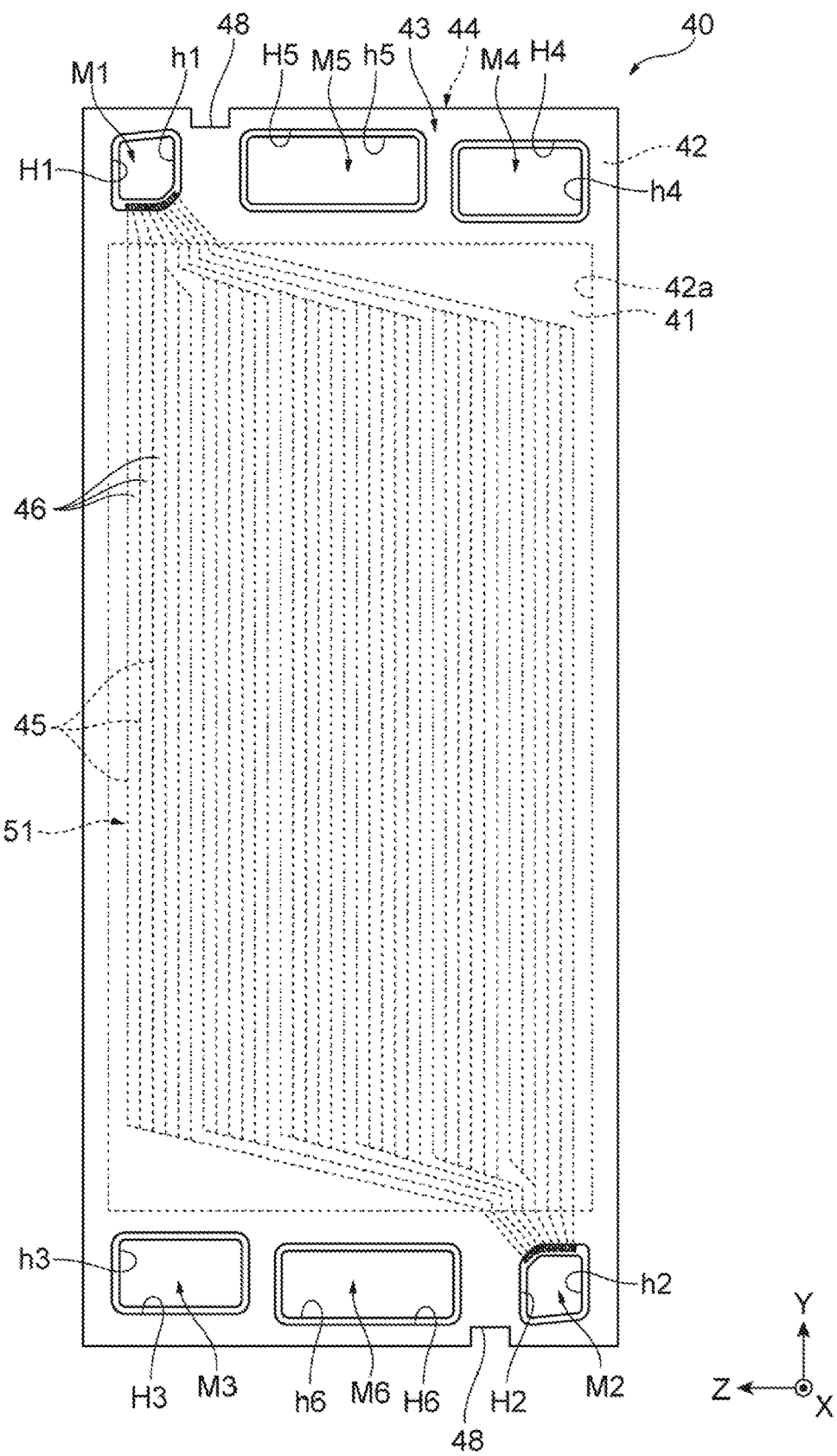
FIG. 2 is a plan view of a fuel cell that forms the fuel cell stack shown in FIG. 1.

FIG. 2 is a plan view of the unit cell 40 that is one of the plurality of fuel cells 40 that forms the fuel cell stack 100 shown in FIG. 1. FIG. 3 is a schematic enlarged cross-sectional view of the unit cell 40 shown in FIG. 2. The unit cell 40 includes a membrane electrode and gas diffusion layer assembly (hereinafter abbreviated as "MEGA") 41, a resin frame 42 surrounding the MEGA 41, and a pair of separators 43, 44 which sandwiches the MEGA 41 and the resin frame 42 therebetween.

The MEGA 41 includes a membrane electrode assembly 41a and gas diffusion layers 41b stacked on the opposite sides of the membrane electrode assembly 41a, and is disposed in a rectangular opening 42a of the resin frame 42. The membrane electrode assembly 41a includes an anode and a cathode that are separately disposed on the opposite faces of an electrolyte membrane, and generates electrical power through a reaction between a first gas and a second gas for power generation. The first gas is fuel gas including hydrogen, for example, and the second gas is oxidant gas, such as air including oxygen, for example.

The resin frame 42 has electrical insulation and flexibility, for example, and is formed in a rectangular frame surrounding the MEGA 41 by punching a film-like resin member that can be subjected to heat-welding. The resin frame 42 is welded to the pair of separators 43, 44, for example, and functions also as a joining member to join the pair of separators 43, 44. The resin frame 42 includes in its outer periphery a plurality of manifold openings h1 to h6 that define manifolds M1 to M6.

The separators 43, 44 are made of a material having gas cutoff properties and electrical conductivity. Examples include a member made of carbon, such as high-density carbon with gas impermeability obtained by compressing carbon particles, or a press-formed member made of metal, such as stainless steel or titanium. One of the pair of separators 43, 44 on the anode side is the separator 43 and the other one of the pair of separators 43, 44 on the cathode side is the separator 44.

The separator 43 on the anode side includes a plurality of streak-like flow channel grooves 45 for distributing fuel gas on the face adjacent to the MEGA 41 and a plurality of streak-like flow channel grooves 46 for distributing refrigerant on the face opposite to the MEGA 41. The separator 44 on the cathode side includes a plurality of streak-like flow channel grooves 47 for distributing oxidant gas on the face adjacent to the MEGA 41 and a plurality of streak-like flow channel grooves 46 for distributing refrigerant on the face opposite to the MEGA 41.

The pair of separators 43, 44 includes a plurality of manifold holes H1 to H6 that define the manifolds M1 to M6. The manifold M1 is coupled to the pipe 2b, through which fuel gas is supplied, via the opening provided in the end plate 10, the insulating plate 20, and the current collector plate 30 shown in FIG. 1, for example. The manifold M2 is coupled to the discharge pipe 2d, through which fuel gas not having been used in the fuel cell stack 100 will be discharged, via the opening provided in the end plate 10, the insulating plate 20, and the current collector plate 30 shown in FIG. 1, for example.

In the same manner, the manifold M3 is coupled to the pipe 3a, through which oxidant gas is supplied, via the opening provided in the end plate 10, the insulating plate 20, and the current collector plate 30 shown in FIG. 1, for example. The manifold M4 is coupled to the discharge pipe 3b, through which oxidant gas not having been used in the fuel cell stack 100 will be discharged, via the opening provided in the end plate 10, the insulating plate 20, and the current collector plate 30 shown in FIG. 1, for example.

The manifold M5 is coupled to the pipe 4a, through which refrigerant is supplied, via the opening provided in the end plate 10, the insulating plate 20, and the current collector plate 30 shown in FIG. 1, for example. In the same manner, the manifold M6 is coupled to the pipe 4c, through which refrigerant discharged from the fuel cell stack 100 is circulated to the radiator 4, via the opening provided in the end plate 10, the insulating plate 20, and the current collector plate 30 shown in FIG. 1, for example.

As shown in FIG. 2, the pair of separators 43, 44, the resin frame 42, and the MEGA 41 form a first gas flow channel 51 and a second gas flow channel (not shown) that are flow channels for power generation. The first gas flow channel 51 is provided on the anode side of the unit cell 40 and the second gas flow channel is provided on the cathode side of the unit cell 40, for example.

The first gas flow channel 51 opens to both of the manifolds M1, M2. The first gas flow channel 51 couples the space between the separator 43 on the anode side and the MEGA 41 to the manifolds M1, M2 by the grooved flow channels provided in the resin frame 42. The first gas flow channel 51 is branched into a plurality of flow channels by the plurality of streak-like flow channel grooves 45 shown in FIG. 2 and FIG. 3 in the space between the separator 43 on the anode side and the MEGA 41.

The second gas flow channel (not shown) opens to both of the manifolds M3, M4. The second gas flow channel couples the space between the separator 44 on the cathode side and the MEGA 41 to the manifolds M3, M4 by the grooved flow channels provided in the resin frame 42. The second gas flow channel is branched into a plurality of flow channels by the plurality of streak-like flow channel grooves 47 shown in FIG. 3 in the space between the separator 44 on the cathode side and the MEGA 41, in the same manner as the first gas flow channel 51 shown in FIG. 2.

With the above-described configuration, the fuel cell system 1 supplies hydrogen gas as fuel gas from the hydrogen tank 2 to the manifold M1 defined by the manifold hole H1 of the plurality of unit cells 40 forming the fuel cell stack 100, for example. In addition, the fuel cell system 1 supplies air including oxygen as oxidant gas from the air pump 3 to the manifold M3 defined by the manifold hole H3 of the plurality of unit cells 40 forming the fuel cell stack 100, for example. Furthermore, the fuel cell system 1 supplies coolant as refrigerant from the pump 4b to the manifold M5 defined by the manifold hole H5 of the plurality of unit cells 40 forming the fuel cell stack 100, for example.

The fuel gas supplied to the manifold M1 of the fuel cell stack 100 flows through the first gas flow channel 51 of each unit cell 40 toward the manifold M2. The oxidant gas supplied to the manifold M3 of the fuel cell stack 100 flows through the second gas flow channel of each unit cell 40 toward the manifold M4. The unit cell 40 generates electrical power through a reaction between the fuel gas flowing through the first gas flow channel 51 and the oxidant gas flowing through the second gas flow channel via the MEGA 41.

Figure 3:
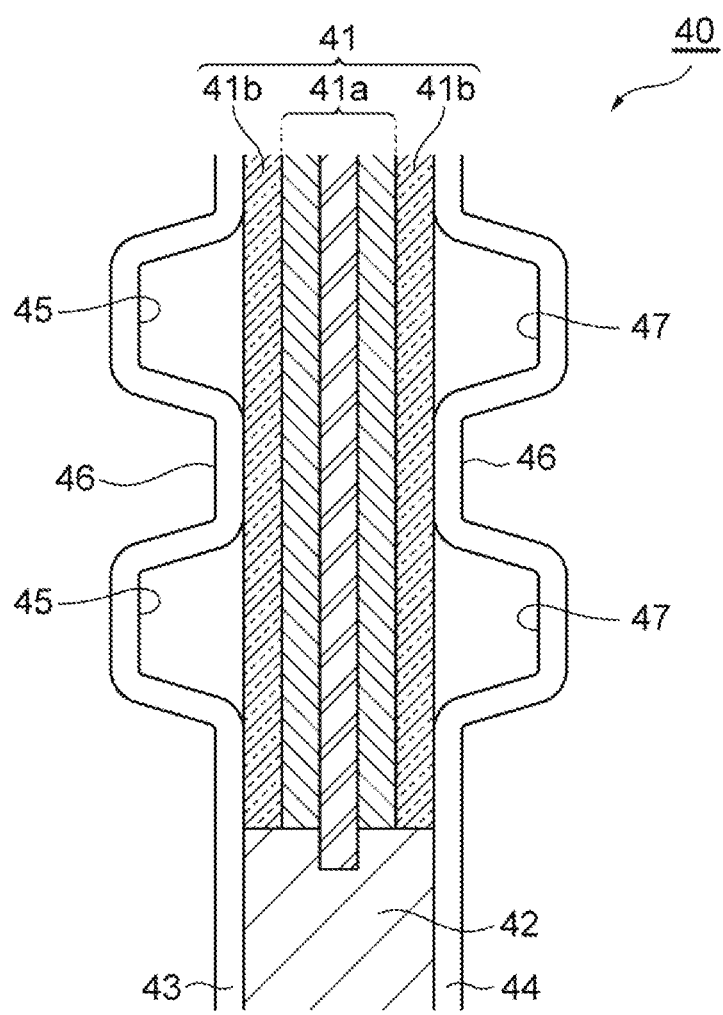
FIG. 3 is an enlarged cross-sectional view of the fuel cell shown in FIG. 2.

In addition, the refrigerant supplied to the manifold M5 of the fuel cell stack 100 flows through the refrigerant flow channel formed between the adjacent unit cells 40 by the flow channel grooves 46 shown in FIG. 3 toward the manifold M6. This configuration can transmit the heat generated in the unit cell 40 by power generation to the refrigerant via the pair of separators 43, 44 and cool the unit cell 40.

The fuel gas that has passed through the first gas flow channel 51 of the unit cell 40 is discharged to the manifold M2 and further to the discharge pipe 2d from the manifold M2. The oxidant gas that has passed through the second gas flow channel of the unit cell 40 is discharged to the manifold M4 and further to the discharge pipe 3b from the manifold M4. The refrigerant that has passed through the refrigerant flow channel between the adjacent unit cells 40 is discharged to the manifold M6 and further to the pipe 4c.

As described above, the fuel cell stack 100 or the unit cell 40 includes three passages, through which three different fluids flow, respectively. More specifically, these three passages include a first gas passage having fuel gas flowing therethrough, a second gas passage having oxidant gas flowing therethrough, and a refrigerant passage having refrigerant flowing therethrough, for example. It should be noted that the first gas passage and the second gas passage are separated from each other by the MEGA 41 and the resin frame 42. In addition, the first and second gas passages and the refrigerant passage are separated from each other by the separators 43, 44 and sealed by a suitable seal part such as a gasket, for example.

(Method and Apparatus for Manufacturing Fuel Cell Stack)

Figure 4:
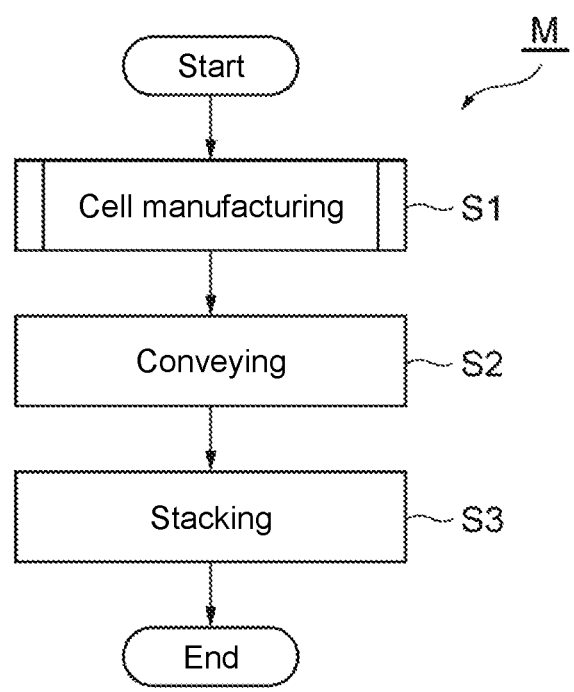
FIG. 4 is a flowchart showing one embodiment of a method for manufacturing fuel cell stack according to the present disclosure.
Figure 5:
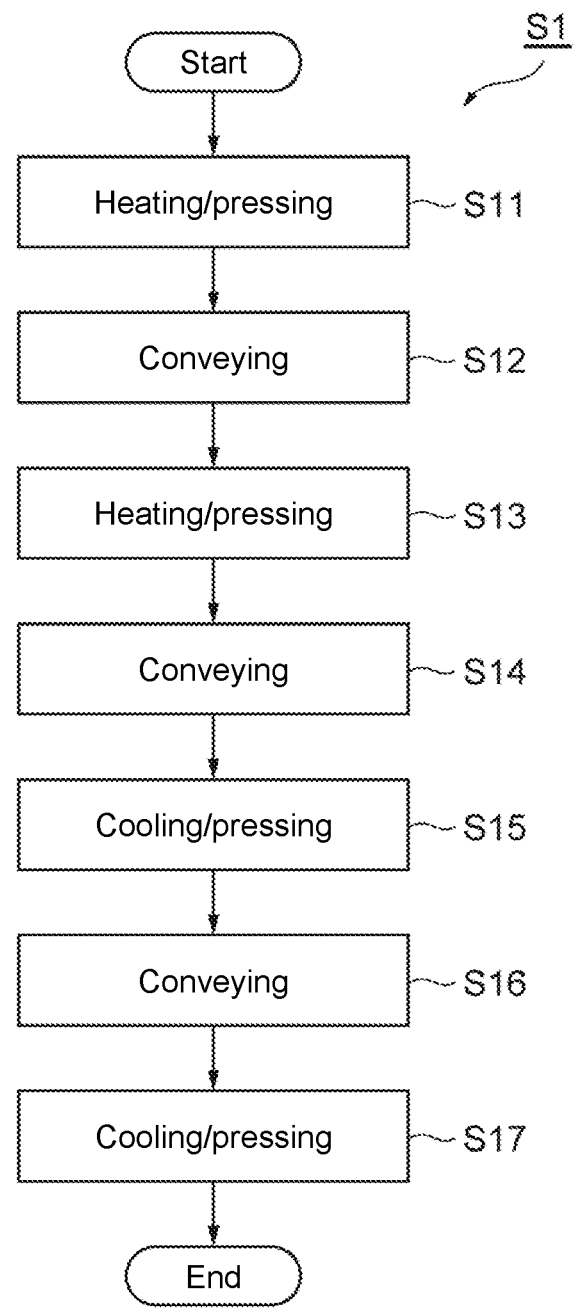
FIG. 5 is a flowchart showing the specific steps of a cell manufacturing process of FIG. 4.

Next, with reference to FIG. 4 to FIG. 11, an embodiment of the method and apparatus for manufacturing a fuel cell stack according to the present disclosure will be described. FIG. 4 is a flowchart showing one embodiment of the method for manufacturing fuel cell stack according to the present disclosure. FIG. 5 is a flowchart showing the specific steps of a cell manufacturing process S1 of FIG. 4.

A fuel cell stack manufacturing method M of the present embodiment is a method for manufacturing the fuel cell stack 100 including the lamination of the plurality of fuel cells 40 (i.e., unit cells 40). The fuel cell stack manufacturing method M includes a cell manufacturing process S1, a conveying step S2, and a stacking step S3, for example.

The cell manufacturing process S1 manufactures an individual fuel cell 40, that is, a unit cell 40. The cell manufacturing process S1 includes a plurality of pressing steps S11, S13, S15, S17 and conveying steps S12, S14, S16 respectively following the pressing steps S11, S13, S15, for example. The plurality of pressing steps S11, S13, S15, S17 includes heating/pressing steps S11, S13 and cooling/pressing steps S15, S17.

The heating/pressing steps S11, S13 dispose the resin frame 42 and the MEGA 41 (i.e., membrane electrode and gas diffusion layer assembly 41), which form the unit cell 40, between the pair of separators 43, 44 and perform pressing while heating the pair of separators 43, 44 at a temperature higher than the softening point of the resin frame 42. The heating/pressing steps S11, S13 include the first heating/pressing step S11 and the second heating/pressing step S13 that performs pressing while heating the pair of separators 43, 44 at a temperature higher than that in the first heating/pressing step S11, for example. The material of the resin frame 42 is a thermoplastic resin having a softening point of about 160° C., for example.

In the first heating/pressing step S11, the pair of separators 43, 44 is placed on the lower die of the first press in a state where the pair of separators 43, 44 sandwiches the MEGA 41 and the resin frame 42 therebetween. Then, between the upper die and the lower die of the first press heated to a temperature higher than or equal to the softening point of the resin frame 42, the pair of separators 43, 44 and the MEGA 41 and the resin frame 42 disposed between the pair of separators 43, 44 are heated and pressurized. This makes the resin frame 42 softened and brings the pair of separators 43, 44, the MEGA 41, and the resin frame 42 in tight contact.

The incomplete unit cell 40 after the first heating/pressing step S11 is conveyed in the conveying step S12 and then placed on the lower die of the second press in the second heating/pressing step S13. The conveying step S12 will be described in detail later. Then, between the upper die and the lower die of the second press heated to a temperature higher than that of the upper and lower dies of the first press in the first heating/pressing step S11, the pair of separators 43, 44 and the MEGA 41 and the resin frame 42 disposed between the pair of separators 43, 44 are heated and pressurized. This makes the resin frame 42 further softened and brings the pair of separators 43, 44, the MEGA 41, and the resin frame 42 in tight contact.

The cooling/pressing steps S15, S17 perform pressing while cooling the pair of separators 43, 44 at a temperature lower than the softening point of the resin frame 42 after the heating/pressing steps S11, S13. The cooling/pressing steps S15, S17 include the first cooling/pressing step S15 and the second cooling/pressing step S17 that performs pressing while cooling the pair of separators 43, 44 at a temperature lower than that in the first cooling/pressing step S15, for example.

The incomplete unit cell 40 after the second heating/pressing step S13 is conveyed in the conveying step S14 and placed on the lower die of the third press in the first cooling/pressing step S15. The conveying step S14 will be described in detail later. Then, between the upper die and the lower die of the third press made to a temperature lower than the softening point of the resin frame 42, the pair of separators 43, 44 and the MEGA 41 and the resin frame 42 disposed between the pair of separators 43, 44 are cooled and pressurized.

This makes the resin frame 42 hardened and integrates the pair of separators 43, 44, the MEGA 41, and the resin frame 42. It should be noted that when the resin frame 42 has a softening point of about 160° C., the cooling temperature of the unit cell 40 in the first cooling/pressing step S15 is in a range of about 100° C. to 140° C., for example.

The incomplete unit cell 40 after the first cooling/pressing step S15 is conveyed in the conveying step S16 and placed on the lower die of the fourth press in the second cooling/pressing step S17. The conveying step S16 will be described in detail later. Then, between the upper die and the lower die of the fourth press made to a temperature lower than that of the upper and lower dies of the third press in the first cooling/pressing step S15, the pair of separators 43, 44 and the MEGA 41 and the resin frame 42 disposed between the pair of separators 43, 44 are cooled and pressurized.

This reduces a warp of the unit cell 40 that has occurred in the conveying steps S12, S14, S16. As a result, variations in the warp amount among the plurality of unit cells 40 decrease to 50% or less as compared to the variations in the warp amount among the unit cells 40 when the second cooling/pressing step S17 is not performed, for example. It should be noted that when the resin frame 42 has a softening point of about 160° C., the cooling temperature of the unit cell 40 in the second cooling/pressing step S17 is in a range of about 30° C. to 50° C., for example.

That is the cell manufacturing process S1 shown in FIG. 4 and FIG. 5 for manufacturing the unit cell 40 by heat-welding the pair of separators 43, 44 and the MEGA 41 via the resin frame 42. After the end of the cell manufacturing process S1, the conveying step S2 is performed as shown in FIG. 4. It should be noted that the fuel cell stack manufacturing method M does not need to include the cell manufacturing process S1 when a complete unit cell 40 is obtained from an outside source, for example.

Figure 6:
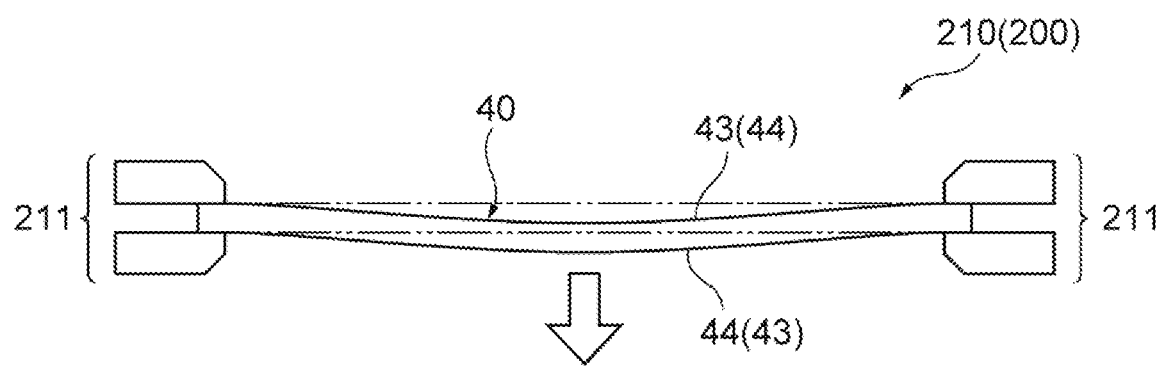
FIG. 6 is a front view schematically showing the conveying steps of FIG. 4 and FIG. 5.

FIG. 6 is a front view schematically showing the conveying steps S2, S12, S14, S16 of FIG. 4 and FIG. 5. The conveying step S12 is performed between the first heating/pressing step S11 and the second heating/pressing step S13 of the cell manufacturing process S1 as described above to convey the unit cell 40 from the first press to the second press. The conveying step S14 is performed between the second heating/pressing step S13 and the first cooling/pressing step S15 of the cell manufacturing process S1 as described above to convey the unit cell 40 from the second press to the third press.

The conveying step S16 is performed between the first cooling/pressing step S15 and the second cooling/pressing step S17 of the cell manufacturing process S1 to convey the unit cell 40 from the third press to the fourth press. The conveying step S2 is performed after the end of the cell manufacturing process S1 to convey the complete unit cell 40 to the stacking step S3, for example.

The conveying steps S12, S14, S16, S2 convey the unit cell 40 with its opposite ends held in a state where the unit cell 40 is horizontally placed and the pair of separators 43, 44 of the unit cell 40 vertically faces each other. Herein, the vertical arrangement of the pair of separators 43, 44 is not particularly limited, and either one of the separators 43, 44 in pair may be placed on top of another. As shown in FIG. 6, the conveying steps S12, S14, S16, S2 are performed by a conveying device 210 that holds the opposite ends of the unit cell 40. The conveying device 210 is a part of a fuel cell stack manufacturing apparatus 200 of the present embodiment.

In the conveying steps S2, S12, S14, S16, the unit cell 40 is horizontally placed and conveyed with its opposite ends held such that the opposed outer faces of the pair of thin plate-like separators 43, 44, that is, the upper and lower faces of the unit cell 40 in FIG. 6, are generally horizontal, for example. This causes the unit cell 40 to sag downward at its center between the opposite ends due to its own weight. As a result, a downwardly-curved (i.e., concave) warp occurs in the unit cell 40 as shown in FIG. 6, for example. In the conveying step S2 after the cell manufacturing process S1, the unit cell 40 is conveyed to the next stacking step S3.

Figure 7:
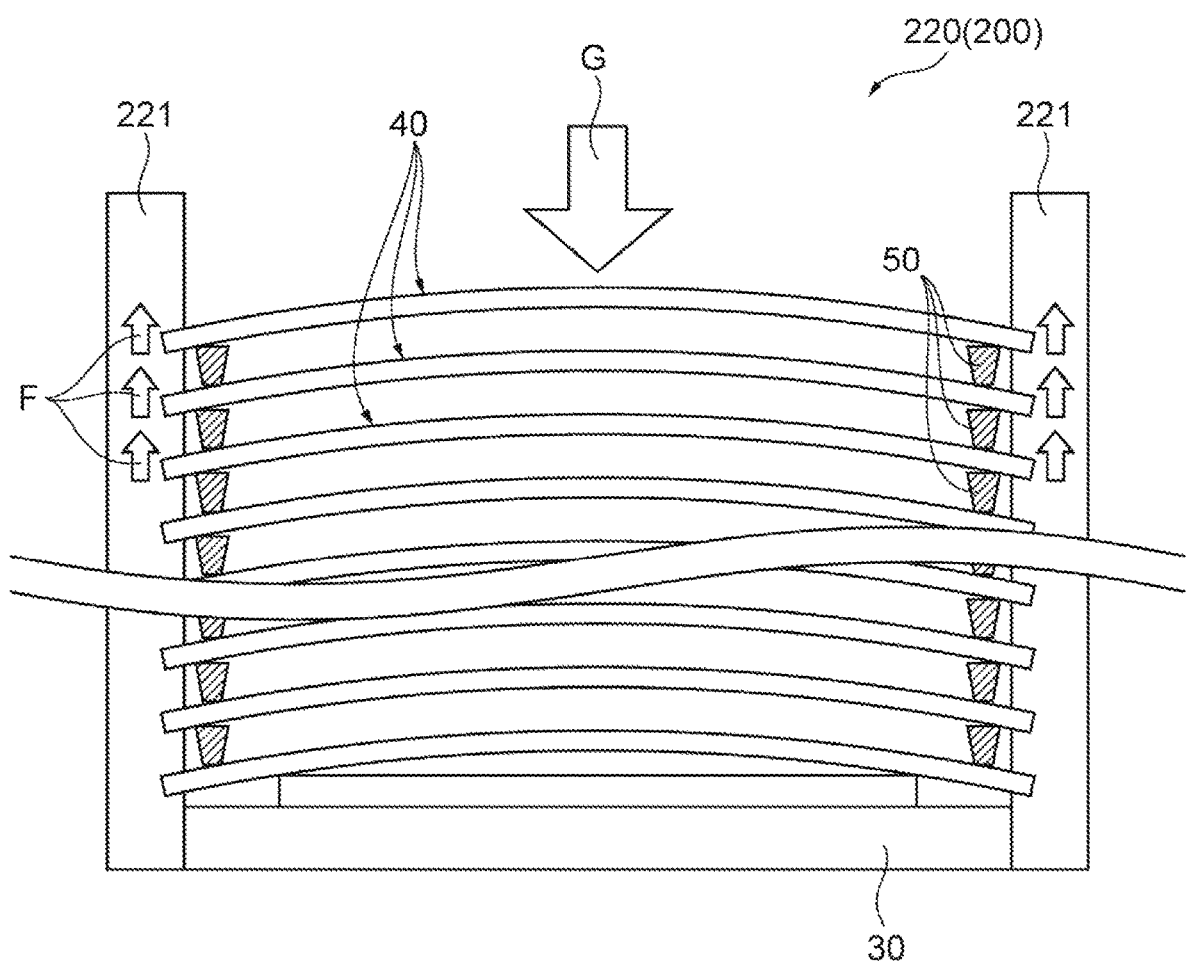
FIG. 7 is a front view schematically showing the plurality of fuel cells before pressurized in the stacking step of FIG. 4.
Figure 8:
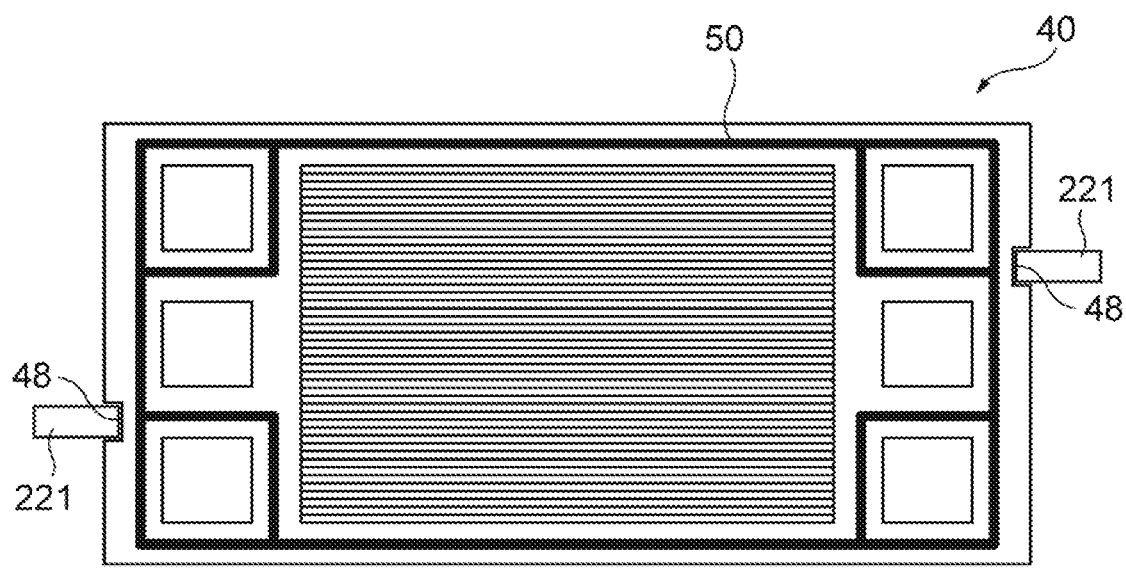
FIG. 8 is a schematic plan view of the stacking device and the fuel cell shown in FIG. 7.
Figure 9:
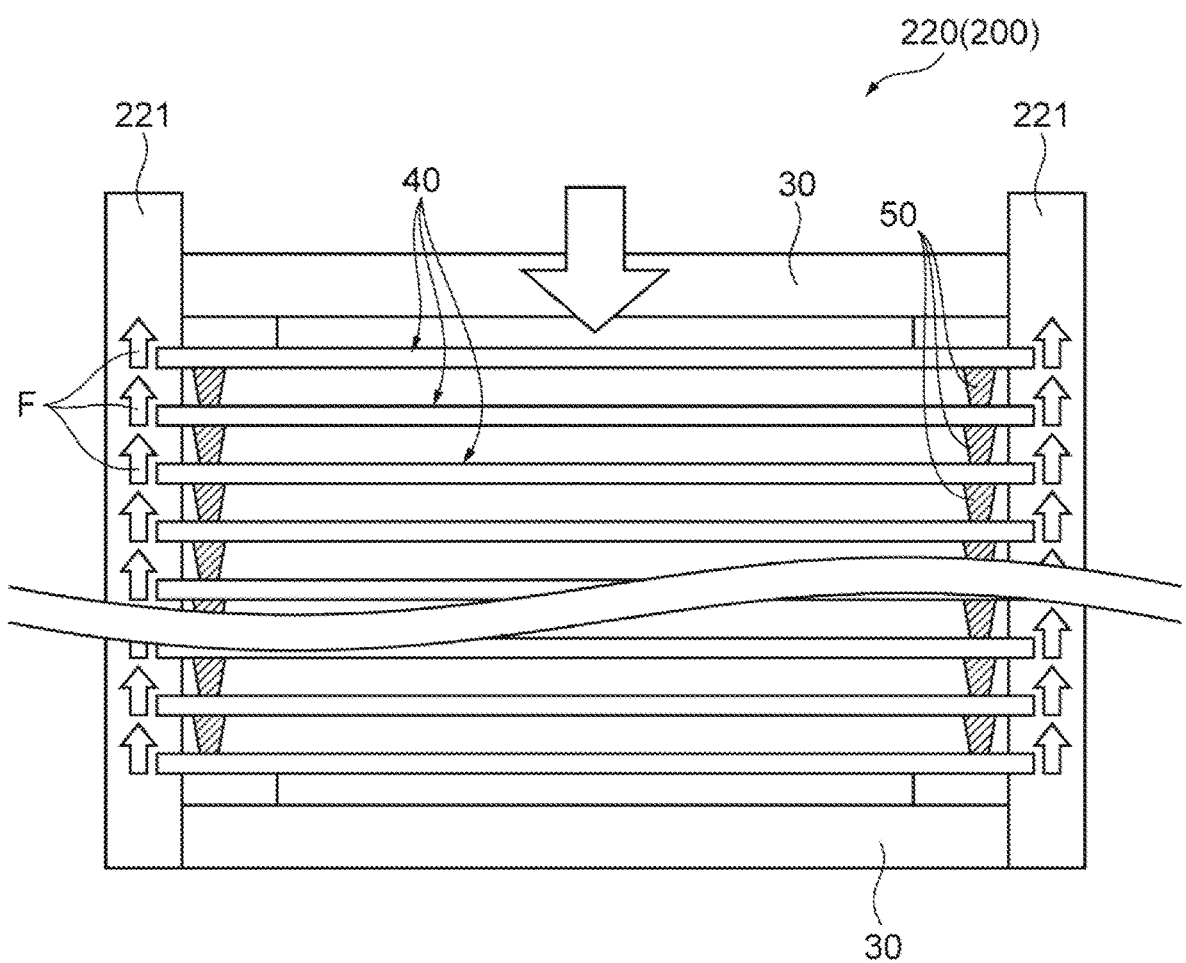
FIG. 9 is a front view schematically showing the plurality of fuel cells after pressurized in the stacking step of FIG. 4.

FIG. 7 is a front view schematically showing the plurality of unit cells 40 before pressurized in the stacking step S3 of FIG. 4. FIG. 8 is a schematic plan view of the stacking device 220 and the unit cell 40 shown in FIG. 7. FIG. 9 is a front view schematically showing the plurality of unit cells 40 after pressurized in the stacking step S3 of FIG. 4. The stacking device 220 shown in FIG. 7 is a part of the fuel cell stack manufacturing apparatus 200 of the present embodiment.

It should be noted that as shown in FIG. 8, a gasket 50 interposed between the unit cells 40 in the stacking step S3 is a closed rectangular loop or frame, for example. It should be noted that FIG. 7 and FIG. 9 show the gaskets 50 in sections. The gasket 50 is made of a resin material having elasticity, such as ethylene propylene diene monomer (EPDM), for example. The gasket 50 is compressed between the unit cells 40 by a predetermined compression amount, so as to seal the spaces between the above-described first gas flow channel, second gas flow channel, and refrigerant flow channel by contact pressure.

The stacking step S3 stacks in the vertical direction the plurality of unit cells 40 with the gasket 50 interposed therebetween. The upper and lower sides of the unit cells 40 in the stacking step S3 are inverted from those of the unit cells 40 in the conveying step S2. It should be noted that the upper and lower sides of the unit cells 40 in the conveying step S2 after the cell manufacturing process S1 are equal to those of the unit cells 40 in the conveying steps S12, S14, S16 included in the cell manufacturing process S1, for example.

The fuel cell stack manufacturing apparatus 200 of the present embodiment is an apparatus for manufacturing the fuel cell stack 100 including the lamination of the plurality of fuel cells 40. The fuel cell stack manufacturing apparatus 200 includes the conveying device 210 shown in FIG. 6 and the stacking device 220 shown in FIG. 7. It should be noted that the fuel cell stack manufacturing apparatus 200 may include the first press, the second press, the third press, and the fourth press that are used in the above-described cell manufacturing process S1, for example.

As described above, the conveying device 210 performs the conveying steps S2, S12, S14, S16 to convey the unit cell 40 with its opposite ends held in a state where the unit cell 40 is horizontally placed and the pair of separators 43, 44 of the unit cell 40 vertically faces each other. The conveying device 210 includes a plurality of chucks 211 shown in FIG. 6 and a driving mechanism (not shown), for example. The driving mechanism opens and closes the chucks 211 and moves the chucks 211 holding the unit cell 40 from the initial position to the intended position.

The stacking device 220 is used in the stacking step S3 to stack in the vertical direction the plurality of unit cells 40 with the gasket 50 interposed therebetween. The upper and lower sides of the unit cells 40 in the stacking step S3 are inverted from those of the unit cells 40 in the conveying by the conveying device 210. In the present embodiment, the unit cell 40 has recessed engaging parts 48 in the opposite ends, for example. In this case, the stacking device 220 can include rails 221 extending in the vertical direction. The rails 221 are engaged with the engaging parts 48 in the opposite ends of the unit cell 40 when the unit cells 40 are stacked and apply a vertically upward frictional force to the opposite ends of the unit cell 40.

That is, in the stacking step S3 shown in FIG. 4, the stacking device 220 shown in FIG. 7 and FIG. 8 can be used, for example. Then, in the stacking step S3, the rails 221 extending in the vertical direction are engaged with the engaging parts 48 in the opposite ends of the unit cell 40 and can apply a vertically upward frictional force F to the opposite ends of the unit cell 40. With such a configuration, as shown in FIG. 7, an upwardly-curved (i.e., convex) warp of the unit cell 40 can be reduced by the gravity G acting on the unit cell 40, that is, its own weight of the middle part of the unit cell 40.

In addition, in the stacking step S3, the current collector plate 30 is disposed at both of the lower and upper ends of the plurality of fuel cells 40 as shown in FIG. 9. Then, the plurality of fuel cells 40 is compressed and pressurized between the pair of current collector plates 30, and the gasket 50 interposed between the unit cells 40 is appropriately compressed, so that the space between the unit cells 40 is sealed by the gasket 50. At this time, the rails 221 engaged with the engaging parts 48 in the opposite ends of the unit cell 40 apply the vertically upward frictional force F to the opposite ends of the unit cell 40. This can further reduce the upwardly-curved (i.e., convex) warp of the unit cell 40.

Figure 10:
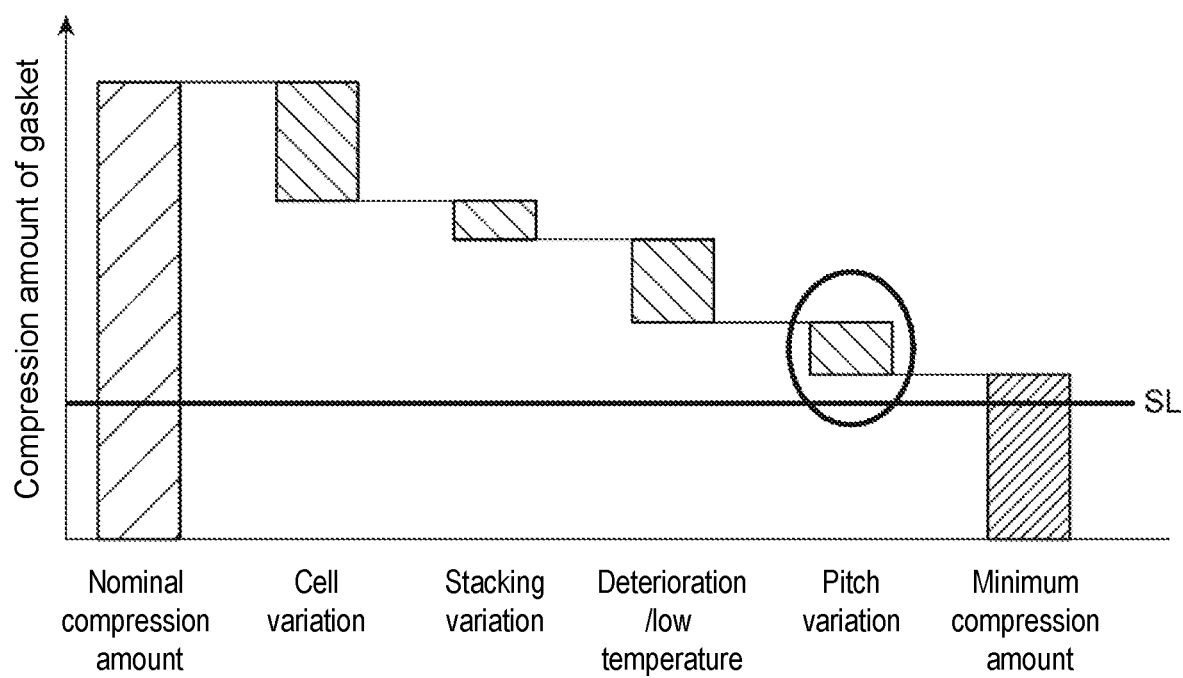
FIG. 10 is a graph showing an example of the relation between a compression amount of a gasket and a pitch variation.

FIG. 10 is a graph showing an example of the relation between a compression amount of the gasket 50 and a pitch variation among the unit cells 40. In FIG. 10, the vertical axis of the graph shows a compression amount of the gasket 50. In FIG. 10, the left end shows a nominal compression amount of the gasket 50 and the right end shows a minimum compression amount of the gasket 50. Between the right and left ends of FIG. 10, a plurality of elements that decreases the compression amount of the gasket 50 is shown. In FIG. 10, examples of such elements that decrease the compression amount of the gasket 50 include a cell variation, a stacking variation, deterioration/low temperature, and a pitch variation.

The cell variation indicates variations in the thickness of the plurality of unit cells 40. The stacking variation indicates variations in the fastening force of the plurality of unit cells 40 as stacked, compressed, and joined. The deterioration/low temperature indicates a decrease in the compression amount of the gasket 50 due to aged deterioration of the gasket 50 or use of the gasket 50 in a low-temperature environment. The pitch variation indicates a decrease in the compression amount of the gasket 50 due to the pitch variation between the plurality of unit cells 40 caused by the warp of the individual unit cell 40.

The compression amount of the gasket 50 may decrease depending on the cell variation, the stacking variation, the deterioration/low temperature, and the pitch variation, for example. For this reason, the nominal compression amount of the gasket 50 is set such that the compression amount of the gasket 50 exceeds a seal limit SL even when the compression amount of the gasket 50 decreases to the minimum compression amount due to such elements. Herein, the seal limit SL of the gasket 50 is a limit value of the compression amount at which the gasket 50 can exhibit the required sealing properties.

That is, when the compression amount falls below the seal limit SL, the gasket 50 can no longer exhibit the required sealing properties. To ensure the sealing properties of the gasket 50, it is important that the pitch variation among the unit cells 40 is reduced. In addition, when the compression amount becomes considerably large, the gasket 50 may have cracks. To avoid such cracks of the gasket 50 as well, it is important that the pitch variation among the unit cells 40 is reduced.

Figure 11:
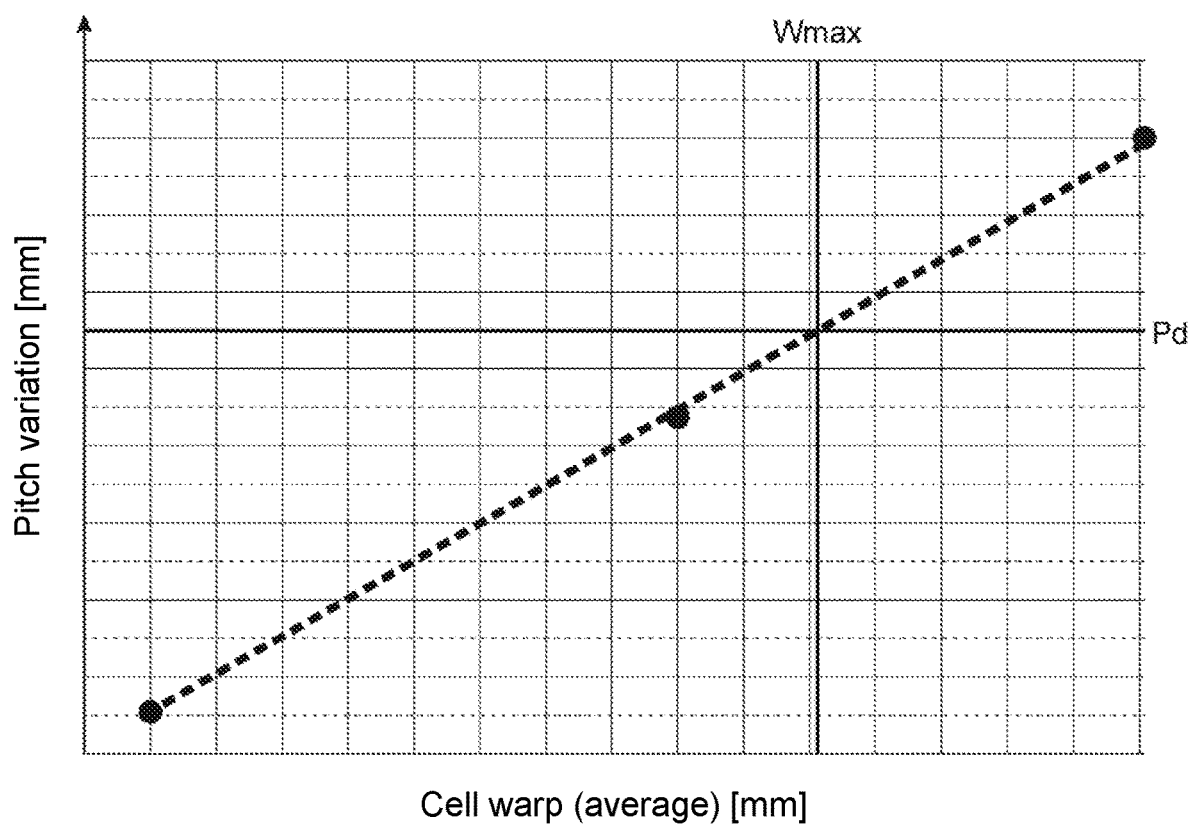
FIG. 11 is a graph showing an example of the relation between a warp of a fuel cell and a pitch variation.

FIG. 11 is a graph showing an example of the relation between a warp of the unit cell 40 and the pitch variation. As shown in FIG. 11, the warp of the unit cell 40 is generally proportional to the pitch variation among the unit cells 40. That is, as the warp of the unit cell 40 increases, the pitch variation among the unit cells 40 increases.

Therefore, to ensure the sealing properties of the gasket 50, it is important that the warp of the unit cell 40 is reduced. An allowable maximum value Wmax of the warp of the unit cell 40 is determined based on an allowable maximum value Pd of the pitch variation.

Figure 12:
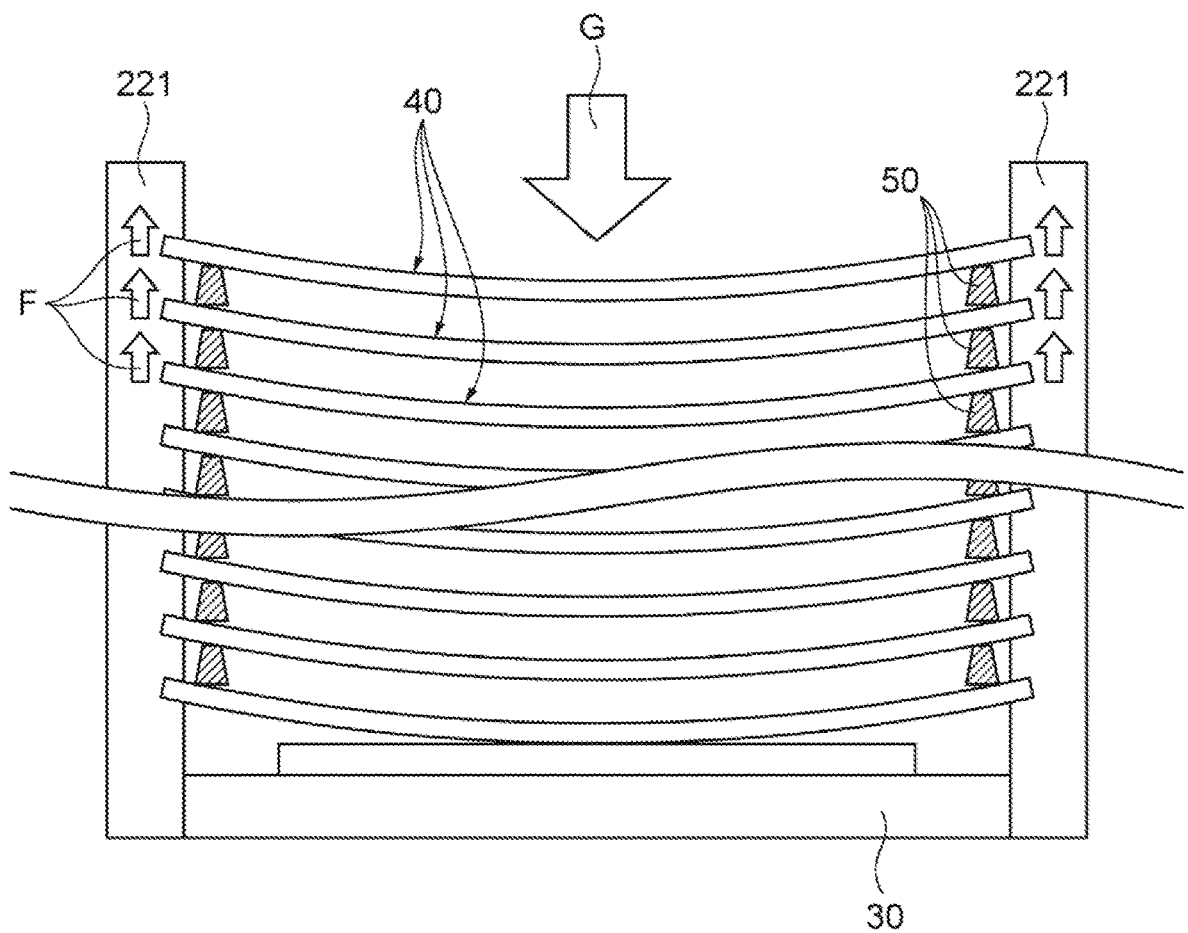
FIG. 12 is a front view showing the plurality of fuel cells before pressurized in the stacking step of a comparative example.
Figure 13:
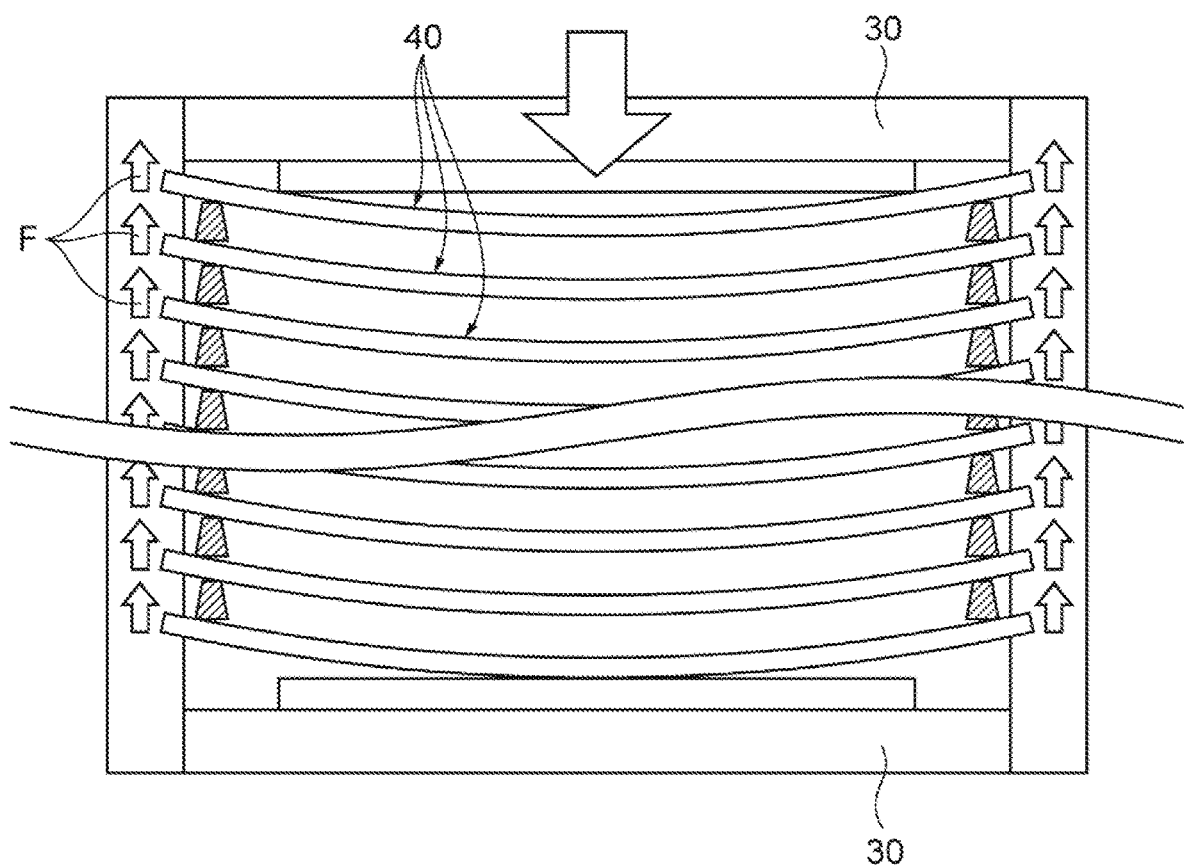
FIG. 13 is a front view showing the plurality of fuel cells after pressurized in the stacking step of the comparative example.

Hereinafter, operational functions of the fuel cell stack manufacturing method M and the fuel cell stack manufacturing apparatus 200 of the present embodiment will be described based on the comparison with a fuel cell stack manufacturing method and a fuel cell stack manufacturing apparatus of a comparative example. FIG. 12 and FIG. 13 are front views each showing the plurality of unit cells 40 before and after pressurized in the stacking step of the comparative example.

As shown in the comparative example of FIG. 12, suppose that the plurality of unit cells 40 with a downwardly-curved (i.e., concave) warp that has occurred in the conveying step S2 is stacked, in the state as it is, via the gaskets 50 in the stacking step. This causes a gravity G to act on the unit cells 40, and the rails 221 apply a vertically upward frictional force F to the opposite ends of the unit cells 40. This advances the warp of the unit cells 40.

In addition, when the plurality of unit cells 40 in the state of being laminated is stored for a certain period of time, e.g., a few days, on plant non-operational days, for example, a warp may occur as shown in FIG. 12. Such a storage time may be generated also in the intervals between the cell manufacturing process S1, the conveying step S2, and the stacking step S3, for example.

Furthermore, as shown in the comparative example of FIG. 13, a current collector plate 30 is disposed at both of the upper and lower ends of the plurality of unit cells 40 stacked to compress and pressurize the plurality of unit cells 40. Then, the rails 221 further apply a vertically upward frictional force F to the opposite ends of the unit cells 40. This further advances the warp of the unit cells 40. As a result, the warp of the unit cell 40 may exceed the maximum value Wmax and the pitch variation among the unit cells 40 may exceed the maximum value Pd shown in FIG. 11. This may cause the minimum compression amount shown in FIG. 10 to fall below the seal limit SL, resulting in loss of sealing properties of the gasket 50.

In addition, the unit cell 40 includes a pair of thin plate-like separators 43, 44 made of titanium or stainless steel, for example. As such, when 300 or more unit cells 40 in the state of being warped are stacked as shown in FIG. 13, for example, each individual unit cell 40 may function as a flat spring. Such a function is prominent as the number of stacked unit cells 40 increases.

As a result, in the example shown in FIG. 13, the plurality of unit cells 40 stacked in the lower side may apply a larger elastic force in the compressing direction to the gaskets 50 between the unit cells 40 stacked in the upper side. This may cause excessive compression. Furthermore, in the example shown in FIG. 13, the warp of the unit cells 40 stacked in the lower side may not be corrected due to the elastic force of the unit cells 40 stacked in the upper side. This may expand the pitch between the unit cells 40, and the compression amount of the gasket 50 between the unit cells 40 may fall below the seal limit SL.

In contrast, the fuel cell stack manufacturing method M of the present embodiment is a method for manufacturing the fuel cell stack 100 including the lamination of the plurality of fuel cells 40 as described above. The fuel cell stack manufacturing method M of the present embodiment includes the conveying steps S12, S14, S16, S2 and the stacking step S3. The conveying steps S12, S14, S16, S2 convey the fuel cell 40 with its opposite ends held in a state where the pair of separators 43, 44 of the fuel cell 40 vertically faces each other. The stacking step S3 stacks in the vertical direction the plurality of fuel cells 40 with the gasket 50 interposed therebetween. The upper and lower sides of the fuel cells 40 in the stacking step S3 are inverted from those of the fuel cells 40 in the conveying steps S12, S14, S16, S2.

In the fuel cell stack manufacturing method M of the present embodiment, in the above-described conveying steps S12, S14, S16, S2, a downwardly-curved (i.e., concave) warp occurs in the fuel cell 40 as shown in FIG. 6. However, by stacking the fuel cells 40 with their upper and lower sides inverted in the stacking step S3, the warp of the fuel cell 40 can be reduced by the weight of the fuel cell 40 and the pressure in compression as shown in FIG. 7 and FIG. 9. Therefore, according to the present embodiment, it is possible to provide the fuel cell stack manufacturing method M that can achieve a uniform pitch between individual fuel cells 40, that is, the unit cells 40, and can increase the sealing properties of the gasket 50 between the unit cells 40.

In addition, in the fuel cell stack manufacturing method M of the present embodiment, the fuel cell 40 has recessed engaging parts 48 in the opposite ends. In the stacking step S3, the rails 221 extending in the vertical direction are engaged with the engaging parts 48 in the opposite ends of the fuel cell 40 and apply a vertically upward frictional force F to the opposite ends of the fuel cell 40. In the stacking step S3, such a configuration can apply a bending stress in a direction opposite to the warp of the fuel cell 40 and increase the effect of reducing the warp of the fuel cell 40 by the weight of the fuel cell 40 and the pressure in compression.

In addition, the fuel cell stack manufacturing method M of the present embodiment includes the cell manufacturing process S1 for manufacturing the fuel cell 40. The cell manufacturing process S1 includes the plurality of pressing steps S11, S13, S15, S17 and the conveying steps S12, S14, S16 respectively following the plurality of pressing steps S11, S13, S15. The plurality of pressing steps S11, S13, S15, S17 includes the heating/pressing steps S11, S13 and the cooling/pressing steps S15, S17. The heating/pressing steps S11, S13 dispose the resin frame 42 and the membrane electrode and gas diffusion layer assembly 41, which form the fuel cell 40, between the pair of separators 43, 44 and perform pressing while heating the pair of separators 43, 44 at a temperature higher than the softening point of the resin frame 42. The cooling/pressing steps S15, S17 perform pressing while cooling the pair of separators 43, 44 at a temperature lower than the softening point of the resin frame 42 after the heating/pressing steps S11, S13.

As described above, the fuel cell stack manufacturing method M of the present embodiment includes the cell manufacturing process S1, which includes the conveying steps S12, S14, S16 where a warp occurs in the fuel cell 40. However, the warp that has occurred in these conveying steps S12, S14, S16 of the cell manufacturing process S1 can be reduced in the stacking step S3. This can achieve a uniform pitch between the unit cells 40 and can increase the sealing properties of the gasket 50 between the unit cells 40.

In addition, in the fuel cell stack manufacturing method M of the present embodiment, the heating/pressing steps S11, S13 include the first heating/pressing step S11 and the second heating/pressing step S13 that performs pressing while heating the pair of separators 43, 44 at a temperature higher than that in the first heating/pressing step S11. The cooling/pressing steps S15, S17 include the first cooling/pressing step S15 and the second cooling/pressing step S17 that performs pressing while cooling the pair of separators 43, 44 at a temperature lower than that in the first cooling/pressing step S15. The conveying steps S12, S14, S16 are performed between the first heating/pressing step S11 and the second heating/pressing step S13, between the second heating/pressing step S13 and the first cooling/pressing step S15, and between the first cooling/pressing step S15 and the second cooling/pressing step S17, respectively.

As described above, since the fuel cell stack manufacturing method M of the present embodiment includes the first heating/pressing step S11 and the second heating/pressing step S13, the temperature of the resin frame 42 can increase efficiently. In addition, since the fuel cell stack manufacturing method M includes the first cooling/pressing step S15 and the second cooling/pressing step S17, variations in the warp of the plurality of unit cells 40 can be significantly reduced. This can achieve a uniform pitch between the unit cells 40 and can increase the sealing properties of the gasket 50 between the unit cells 40.

In addition, the fuel cell stack manufacturing apparatus 200 of the present embodiment is an apparatus for manufacturing the fuel cell stack 100 including the lamination of the plurality of fuel cells 40. The fuel cell stack manufacturing apparatus 200 includes the conveying device 210 and the stacking device 220. The conveying device 210 conveys the unit cell 40 with its opposite ends held in a state where the pair of separators 43, 44 of the fuel cell 40 vertically faces each other. The stacking device 220 stacks in the vertical direction the plurality of fuel cells 40 with the gasket 50 interposed therebetween. The upper and lower sides of the fuel cells 40 to be stacked are inverted from those of the fuel cells 40 in the conveying by the conveying device 210.

In the fuel cell stack manufacturing apparatus 200 of the present embodiment, a downwardly-curved (i.e., concave) warp occurs in the unit cell 40 as shown in FIG. 6 in the conveying of the unit cell 40 by the conveying device 210. However, by stacking the unit cells 40 with their upper and lower sides inverted in the stacking device 220, the warp of the unit cell 40 can be reduced by the weight of the unit cell 40 and the pressure in compression as shown in FIG. 7 and FIG. 9. Therefore, according to the present embodiment, it is possible to provide the fuel cell stack manufacturing apparatus 200 that can achieve a uniform pitch between the unit cells 40 and can increase the sealing properties of the gasket 50 between the unit cells 40.

In addition, in the fuel cell stack manufacturing apparatus 200 of the present embodiment, the fuel cell 40 has recessed engaging parts 48 in the opposite ends. The stacking device 220 includes rails 221 extending in the vertical direction. The rails 221 are engaged with the engaging parts 48 in the opposite ends of the fuel cell 40 when the unit cells 40 are stacked and apply a vertically upward frictional force to the opposite ends of the unit cell 40. In the stacking device 220, such a configuration can apply a bending stress in a direction opposite to the warp of the unit cell 40 and increase the effect of reducing the warp of the unit cell 40 by the weight of the unit cell 40 and the pressure in compression.

That is a detailed description of the embodiment of the method and apparatus for manufacturing a fuel cell stack according to the present disclosure, with reference to the drawings. The specific configuration of the present disclosure is not limited to the above-stated embodiment, and the design may be modified variously without departing from the spirits of the present disclosure. The present disclosure also covers such modified embodiments.

DESCRIPTION OF SYMBOLS

40 Unit cell (fuel cell)
41 MEGA (membrane electrode and gas diffusion layer assembly)
42 Resin frame
43 Separator
44 Separator
48 Engaging part
50 Gasket
100 Fuel cell stack
200 Fuel cell stack manufacturing apparatus
210 Conveying device
220 Stacking device
221 Rail
F Frictional force
M Fuel cell stack manufacturing method
S1 Cell manufacturing process
S11 First heating/pressing step (heating/pressing step, pressing step)
S12 Conveying step
S13 Second heating/pressing step (heating/pressing step, pressing step)
S14 Conveying step
S15 First cooling/pressing step (cooling/pressing step, pressing step)
S16 Conveying step
S17 Second cooling/pressing step (cooling/pressing step, pressing step)
S2 Conveying step
S3 Stacking step

What is claimed is:

1. A method for manufacturing a fuel cell stack including lamination of a plurality of fuel cells, the method comprising:
a conveying step of conveying each of the plurality of fuel cells with opposite ends thereof held in a state where a pair of separators forming each of the plurality of fuel cells vertically faces each other; and
a stacking step of stacking in a vertical direction the plurality of fuel cells with a gasket interposed therebetween, the plurality of fuel cells having upper and lower sides that are inverted from those of the plurality of fuel cells in the conveying step.

2. The method for manufacturing a fuel cell stack according to claim 1, wherein: each of the plurality of fuel cells includes a recessed engaging part in each of the opposite ends thereof, and in the stacking step, a rail extending in a vertical direction is engaged with the engaging part in each of the opposite ends of a respective fuel cell and applies a vertically upward frictional force to each of the opposite ends of the respective fuel cell.

3. The method for manufacturing a fuel cell stack according to claim 1, comprising a cell manufacturing process of manufacturing a fuel cell of the plurality of fuel cells, the cell manufacturing process including a plurality of pressing steps and the conveying step after each of the plurality of pressing steps,
wherein the plurality of pressing steps includes:
a heating/pressing step of disposing a resin frame and a membrane electrode and gas diffusion layer assembly, which form the fuel cell, between the pair of separators and performing pressing while heating the pair of separators at a temperature higher than a softening point of the resin frame; and
a cooling/pressing step of performing pressing while cooling the pair of separators at a temperature lower than the softening point of the resin frame after the heating/pressing step.

4. The method for manufacturing a fuel cell stack according to claim 3, wherein:
the heating/pressing step includes a first heating/pressing step and a second heating/pressing step that performs pressing while heating the pair of separators at a temperature higher than that in the first heating/pressing step,
the cooling/pressing step includes a first cooling/pressing step and a second cooling/pressing step that performs pressing while cooling the pair of separators at a temperature lower than that in the first cooling/pressing step, and the conveying step is performed between the first heating/pressing step and the second heating/pressing step, between the second heating/pressing step and the first cooling/pressing step, and between the first cooling/pressing step and the second cooling/pressing step.

5. An apparatus for manufacturing a fuel cell stack including lamination of a plurality of fuel cells, the apparatus comprising:

a conveying device configured to convey each of the plurality of fuel cells with opposite ends thereof held in a state where a pair of separators forming each of the plurality of fuel cells vertically faces each other; and a stacking device configured to stack in a vertical direction the plurality of fuel cells with a gasket interposed therebetween, the plurality of fuel cells having upper and lower sides that are inverted from those of the plurality of fuel cells conveyed by the conveying device.

6. The apparatus for manufacturing a fuel cell stack according to claim 5, wherein: wherein: each of the plurality fuel cells includes a recessed engaging part in each of the opposite ends, the stacking device includes a rail extending in a vertical direction, and the rail is engaged with the recessed engaging part of a respective fuel cell when the plurality of fuel cells are stacked and applies a vertically upward frictional force to each of the opposite ends of the respective fuel cell.

* * * * *